June 27, 1961 O. P. LANCE ET AL 2,990,053
CONVEYOR
Filed Dec. 16, 1959 2 Sheets-Sheet 1

INVENTORS.
O. P. LANCE
W. A. MURRAY
BY
ATTORNEYS

June 27, 1961　　O. P. LANCE ET AL　　2,990,053
CONVEYOR

Filed Dec. 16, 1959　　2 Sheets-Sheet 2

INVENTORS.
O. P. LANCE
W. A. MURRAY

ATTORNEYS

United States Patent Office 2,990,053
Patented June 27, 1961

2,990,053
CONVEYOR
Orville P. Lance and William A. Murray, Moline, Ill., assignors to Deere & Company, Moline, Ill., a corporation of Delaware
Filed Dec. 16, 1959, Ser. No. 859,991
10 Claims. (Cl. 198—185)

This invention relates to a conveyor. More particularly this invention relates to a conveyor which will normally move material bound in bales. Still more particularly this invention relates to a means discharging bales over one side of the conveyor.

In the conventional type bale conveyor there is normally provided an elongated structure having a floor with opposed side walls extending upwardly from the floor to form a trough in which the bales may travel. In most instances a chain or raddle type conveyor is provided which moves the bales longitudinally of the trough. Often the side walls are composed basically of rails which may be removed. Therefore, when it is desired to remove the bales from the conveyor one of the conventional methods of doing such is to remove one of the side rails leaving therein a space or discharge opening in the side wall and to place the removed rail diagonally across the conveyor to guide the bales through the discharge opening left by the removed rail. This, of course, is a very simplified method of removing bales and to a certain extent is very practical. However, there are certain disadvantages to discharge by this means. For example, in moving the bales of hay along an overhead conveyor in a hayloft often times the bale conveyor will be mounted close to the rafters in the loft and are generally out of reach. Consequently the removal and replacement of rails on such a conveyor creates a dangerous as well as often times an impractical situation. Also, there is a cost problem involved since many of the bale conveyors used for removing hay are composed of rigid sections of fixed lengths. The rails are generally of a rigid one piece length and serve as part of the main frame of the conveyor. Consequently they cannot be removed without weakening the structure and to provide a removable rail on such a conveyor would create considerable expense as pertains to the cost of mounting as well as substituting other frame structure for the rail.

It is therefore the main object of the present invention to provide a carriage which is movable longitudinally along a bale conveyor having rigid and elongated side structures. It is proposed to provide with the carriage means of raising the bales over the side structures and to provide adjustment of the latter means so that the bales may be discharged over either side of the conveyor.

It is still a further object of the present invention to incorporate with the carriage a suitable mounting guide which will permit the carriage to move lengthwise of the conveyor and will retain the guide rigidly on the conveyor.

Other objects and advantages of the present invention will become apparent to those skilled in the art as the nature of the invention is better understood from the following description and as shown in the accompanying drawings.

Figure 1:
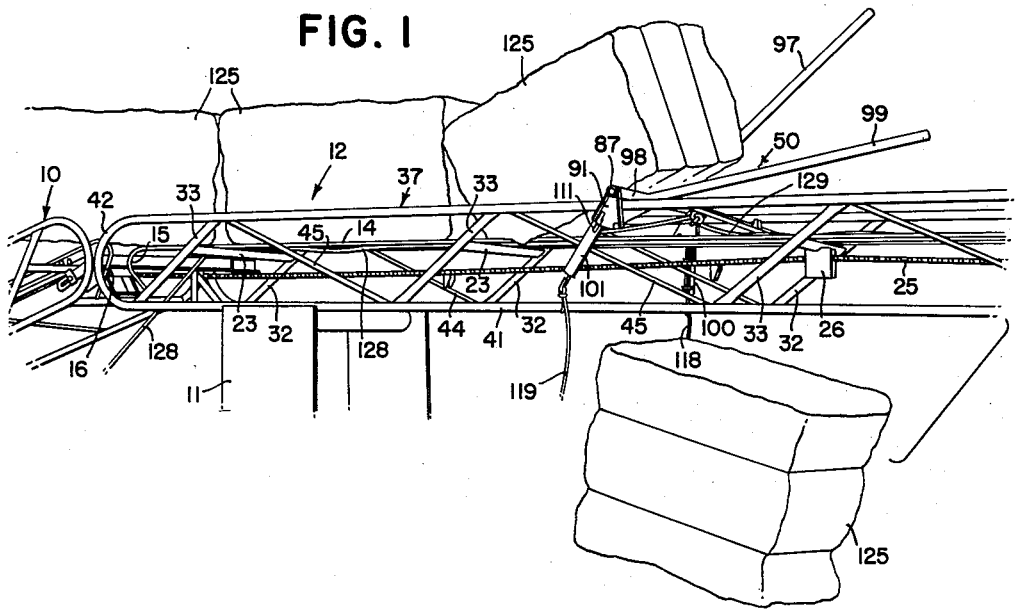
FIG. 1 is a side perspective view of the conveyor with the carriage position to discharge bales over one side of the conveyor.

The conveyors herein to be described generally operate in a series, i.e. they are mounted in end to end relation depending upon the distance it is desired to carry the material. For example, in a barn of considerable length, there may be as high as four or five conveyors mounted in end to end relation so as to cover the entire length of the barn. Also, one conveyor may operate as the elevator, such as shown at 10 in FIG. 1, removing the baled material from the ground or truck level to the overhead conveyor. Generally, the conveyors are mounted in overhead relation to the floor or ground and are supported in a suspending relation from the rafters of the building or may be supported from underneath as is shown at 11 in FIG. 1.

The conveyor, indicated in its entirety by the reference numeral 12, is composed of a floor structure including a pair of transversely spaced longitudinally extending rods 13, 14 and turned downwardly at opposite end as is shown at 15, 16 (FIG. 1) in order to provide a rather smooth or curved end for receiving the bales on the conveyor section. The floor structure further includes an upwardly opening chain guard 17 with outwardly and horizontally extending flanges 18, 19. The rods 13, 14 and chain guard 17 are welded at 20, 21 and 22 respectively to underlying transverse rods or tubular shafts 23. A continuous chain having an upper run 24 riding in the longitudinal guard 17 and a lower run 25 positioned beneath the cross-rod 23, operates to move bales over the floor structure. A V-shaped guide or guard 26 having a chain guide 27 depends from the crossrods 23 and operates generally to prevent lateral sway of the lower run 25. Lugs 28 project from the chain runs 24, 25 to aggressively engage the bales.

Opposite ends of the shafts 23 are welded at 30, 31 to inclined truss rods 32, 33 which form a part of rigid side structures 34, 35. The side structures 34, 35 are composed of oppositely disposed longitudinally extending and continuous tubular elements with upper parallel and longitudinally extending portions 38, 39 respectively, which serve as side guide rails for the bales, and lower portions 40, 41 which underlie the floor structure. The sections 38, 40 and 39, 41 are joined together at opposite ends by means of integral curved portions, one of which is shown at 42 is FIG. 1. Also the pipe sections 38, 40 and pipe sections 39, 41 are further rigidly joined by an interlacing of truss members, part of the truss members 32, 33 having been discussed relative to the support for the transverse rods 23, and truss rods 44, 45 respectively. Generally it should be recognized that the side structures 34, 35 are rigidly connected to the floor structure with the upper edges of the side structures 34, 35, as indicated by the upper pipe sections 38, 39 being disposed above the floor structure so that the side structures 34, 35 form with the floor structure an elongated trough in which the bales will normally move.

Figure 2:
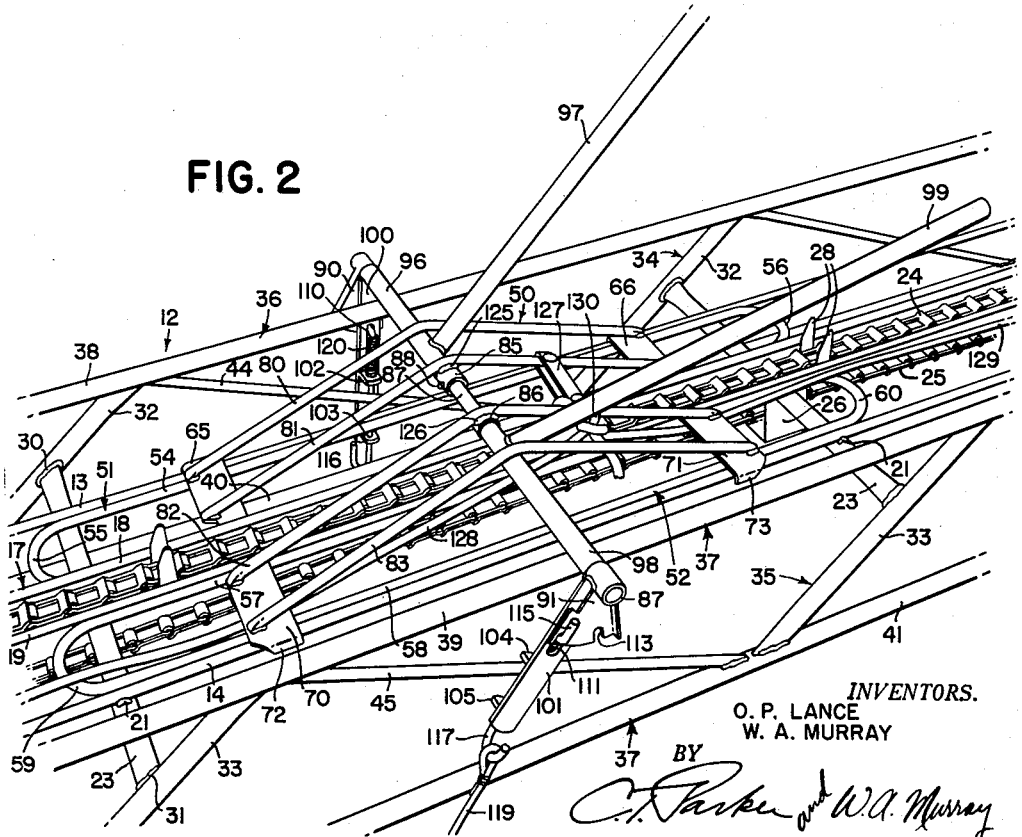
FIG. 2 is a top and side perspective of the bale discharge carriage and a portion of the bale conveyor.
Figure 3:
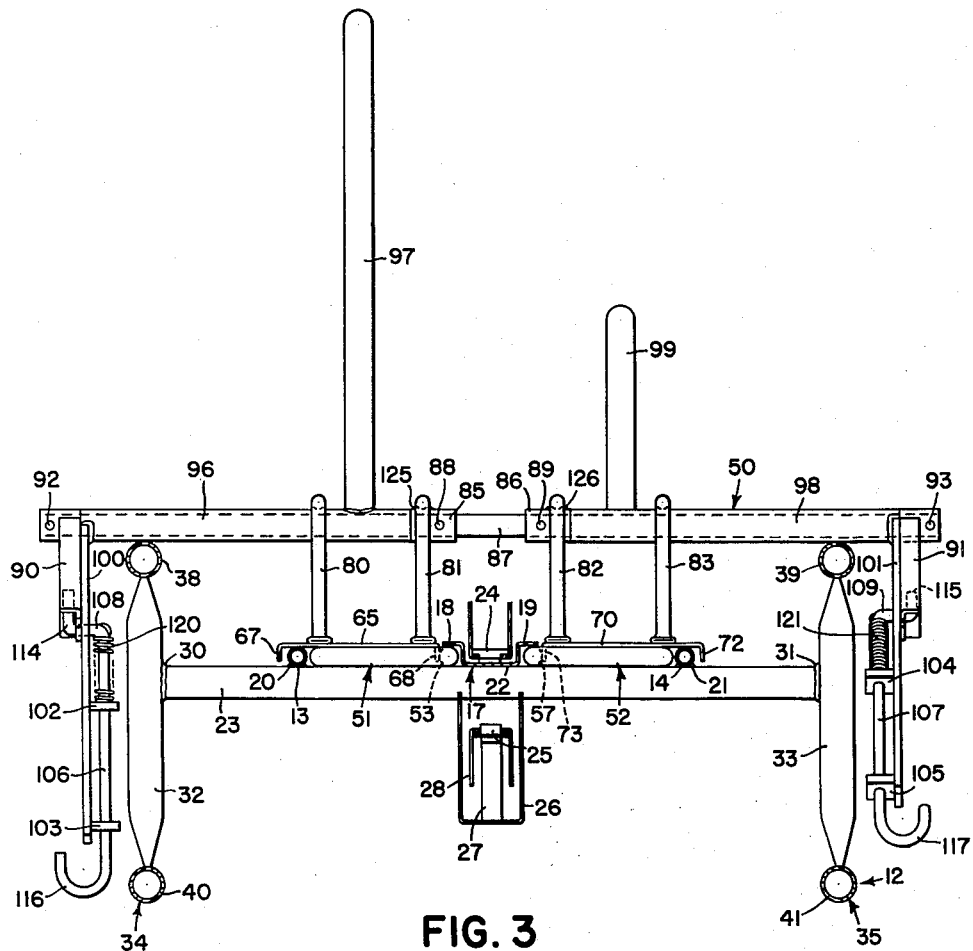
FIG. 3 is a transverse vertical sectional view taken through the conveyor and at one end of the discharge carriage.

A carriage 50 is supported on the floor structure of the conveyor. The carriage 50 comprises a pair of horizontally disposed continuous rods 51, 52 which lie adjacent the floor structure of the conveyor. The rod 51 is composed of an inner longitudinally extending section 53 which normally underlies the flange 18 of the chain guard 17, and an outer longitudinally extending section 54 which runs adjacent to and parallel to the floor structure tubing or rod 13. The inner and outer rod sections 53, 54 are interconnected by integral bight portions 55, 56. The continuous rod 52 is composed of an inner rod section 57 which underlies the flange 19 on the guard 17 and an outer longitudinally extending section 58 which lies adjacent and parallel to the floor rod 14. The longitudinal inner and outer sections 57, 58 are interconnected at their opposite ends by bight portions 59, 60. As may be clearly seen from reviewing FIGS. 2, 3 the rods 51, 52 and flanges 17, 18 operate as track and guide means permitting longitudinal movement of the carriage 50 while at the same time retaining it on the floor structure. Transverse brace plates 65, 66 are welded to the upper surface of the longitudinal sections 53, 54 and have at their opposite ends downwardly extending and longitudinally extending flanges such as is shown at 67, 68 (FIG. 3). The floor rod 20 is disposed between the outer longitudinal section 54 and the outer depending flanges, such as at 67 and consequently operates as a further guide for longitudinal movement of the carriage 50.

A similar guide arrangement is provided at the opposite side of chain guards 17 and includes a pair of transverse brace plates 70, 71 inwardly of the bight portions 59, 60, suitably welded to the longitudinal rod sections 57, 58. The brace plates 70, 71 are provided with depending flanges such as is shown at 72, 73 and consequently will also serve as a further guide for longitudinal movement of the carriage along the floor structure. The brace plates 70, 71 are also provided with downwardly extending flanges, one of which is shown at 74 in FIG. 3 which lies adjacent to and is fixed to the inner surface of the inner rod section 57.

Platform means in the form of two pair of parallel rods 80, 81 and 82, 83 are inclined upwardly from lower opposite ends adjacent to the floor structure to upper mid-portions substantially midway between the ends. The rods 80, 81 are fixed at opposite ends to the transverse brace plate 65, 66 and the rods 82, 83 are fixed at opposite ends to the transverse brace plates 70, 71. The mid-portions of the inclined sections are disposed above the upper edges 38, 39 of the side structures 34, 35 so that bales ascending the platform means will reach a height above the side structures. The two inner rods 81, 82 carry at their mid-portions inwardly directed short pipe sections 85, 86 which carry within them a horizontally and transversely disposed shaft 87 extending across and above the conveyor with opposite ends thereof projecting outwardly of the side structures 34, 35. The shaft is held against rotation by means of set screws 88, 89. Fixed by set screws 92, 93 to opposite ends of the shaft 87 is a pair of sectors or quadrants 90, 91.

Mounted for pivotal movement on the shaft 87 are longitudinal guide elements or means comprising on one side of the conveyor an elongated hub or spacer portion 96 and a longitudinally extending guide element or rod 97 and on the opposite side of the conveyor a hub portion 98 and a longitudinally extending guide element rod 99. The hub or spacer members 96, 98 extend between the pipe sections 85, 86 and the outer quadrants 90, 91 respectively and are hinged or pivotally mounted on the shaft 87. The spacer portions 96, 98 and shaft 87 therefore operate as transverse hinge means for raising or lowering the guide or rod elements 97, 99.

Depending levers 100, 101 rigid with the respective hubs 96, 98 lie adjacent to the inner surfaces of the quadrants 90, 91 and operate to rock the rods 97, 99 on the shaft 87. The inner surfaces of the levers 100, 101 carry inwardly extending brackets 102, 103 and 104, 105 respectively which have suitable openings for receiving locking rods 106, 107 which have outwardly turned upper ends 108, 109 respectively. Supported on the rods 106, 107 between the respective lugs 102, 104 and the respective ends 108, 109 of the rods are a pair of springs which normally bias the rods toward the shaft 87. The levers 100, 101 are provided with radial slots 110, 111 for receiving the ends 108, 109. The quadrant or sectors 90, 91 are provided with arcuately spaced slots, such as is shown at 112, 113 in the sector 91, for receiving the outer ends of the rod upper ends 108, 109. The rod upper ends 108, 109 are further turned upwardly to have portions 114, 115 lie adjacent the outer surfaces of the sectors 90, 91. The upper ends 108, 109 normally seat in one of the arcuately spaced slots and lock the respective levers 106, 107 to prevent rotation of the levers about the axis of the shaft 87. The lower ends of the rods 106, 107 have hooked ends 116, 117 on which may be attached ropes or cords 118, 119 respectively.

Viewing the entire carriage as a whole, it becomes apparent that the control rods 97, 99 normally extend upwardly in the direction of travel of the bales and serve generally as a continuation of the inclined platform. The relative vertical disposition of the rods 97, 99 to one another effect the direction of discharge of the bales, i.e. as to which side the bales will be discharged. Viewing FIG. 1, there is provided a series of bales 125 which is being pushed or conveyed along the floor structure of the conveyor by means of the lugs 28 on the upper run of the chain 24. The bales are moved along the floor until the leading bale contacts and then ascends the inclined platform formed by the inclined rod sections 80, 81, 82, 83. The lead bale is forced upwardly along the inclined platform by the chain lugs 28 and also by the bales following the lead bale. By raising guide rod 97 higher than rod 99, the bale is tilted to the one side of the conveyor and passes over the upper rod or edge 39 of the side wall structure. Should it be desired to discharge the bale over the upper edge or rod 38 of the side structure, the guide rod 99 is raised to a higher level than the guide rod 97 and consequently the bale will be tilted in the direction of the upper edge 38 of that side structure. The guide rods 97, 99 may be adjusted from floor level by pulling downwardly on the respective ropes 118, 119 to pull the rods 106, 107 clear of the downwardly opening slots in the lower edge of the sectors 90, 91 and repositioning the levers 100, 101 and their associated rods 97, 99 in the location desired.

It will be noted that the inner inclined rods 81, 82 are welded as at 125, 126 to the respective short pipe sections 85, 86 which, as previously mentioned is fixed by set screws to the shaft 87. The rods 81, 82 are also rigidly connected by means of a connecting strap 127. Thus, it becomes apparent that the entire carriage is a rigid unit. Adjacent the strap 127 is provided a pair of ropes or cords 128, 129 which are tied to the downwardly inclined portion of the inner rod 82, the knot being generally indicated by the reference numeral 130. The ropes 128, 129 extend downwardly under the transverse brace plates 70, 71 and then longitudinally over the respective bight sections 59, 60 to opposite ends of the conveyor and downwardly to be suitably anchored. It obviously becomes apparent that the entire carriage may be moved longitudinally along the floor structure formed by the longitudinal floor rods 13 14 and the chain guide 17 by releasing the anchorage of the ropes 128, 129 and pulling on one rope to direct the carriage toward the desired end of the conveyor. Again, the ropes 128, 129 may be tied or otherwise anchored to hold the carriage in its desired location.

While only one form of the invention has been shown, it should be recognized that other forms and variations will occur to those skilled in the art. Therefore, it should be understood that while the present form was disclosed in detailed manner for the purpose of clearly and concisely illustrating the principles of the invention it was not the intention to so limit or narrow the invention beyond the broad concepts set forth in the appended claims.

What is claimed is:

1. A bale conveyor comprising: a longitudinally extending floor structure; a chain conveyor supported on the floor and adapted to move bales in a given direction longitudinally over the floor; a pair of longitudinally extending upright side structures rigid with and disposed on opposite sides of the floor structure whereby bales moving over the floor structure will pass between the side structures, each of the side structures having an upper edge positioned above the plane of the floor structure to define with the latter a longitudinal trough; a carriage supported on the floor structure and adjustably movable longitudinally of the trough; hinge means supported on the carriage proximate the height of the side structure's upper edges; a platform structure on the carriage having a lower end proximate the floor structure and inclined upwardly and in the direction of movement of the bales to an upper end adjacent the transverse shaft means; a pair of transversely spaced longitudinally extending guide elements pivotally mounted on the hinge means for vertical movement about the hinge means, the guide elements normally extending from the hinge means in the direction of bale movement and forming a continuation of the inclined platform structure, the guide elements further being disposed on opposite sides of the longitudinal centerline of the trough; and means for adjusting said elements vertically relative to one another whereby one element may be positioned higher than the other to effect movement of a bale moving up the platform structure over the upper edge of the side structure adjacent the lower of the elements.

2. A bale conveyor comprising: a longitudinally extending horizontally disposed floor structure; a conveyor supported on the floor structure and adapted to move bales in a given direction longitudinally over the floor structure; a pair of longitudinally extending upright side structures rigid with and disposed on opposite sides of the floor structure whereby bales moving over the floor structure will pass between the side wall structures, each of the side structures having an upper edge positioned above the horizontal plane of the floor structure to define with the latter a longitudinal trough; a carriage supported on the floor structure and adjustably movable longitudinally of the trough; transverse hinge means supported on the carriage; a platform structure on the carriage having a lower end proximate the floor structure and inclined upwardly and in the direction of movement of the bales; transversely spaced longitudinally extending guide elements pivotally mounted on the hinge means for vertical movement relative thereto, the guide elements normally extending from the hinge means in the direction of bale movement and forming a continuation of the inclined platform structure; and means for adjusting said elements vertically and relative to one another whereby the continuation of the platform structure may be tilted to one side to effect movement of a bale moving up the platform structure over the upper edge of one of the side structures.

3. A bale conveyor comprising: a longitudinally extending horizontally disposed floor structure; a conveyor supported on the floor structure and adapted to move bales in a given direction longitudinally over the floor structures; a pair of longitudinally extending upright side structures rigid with and disposed on opposite sides of the floor structure whereby bales moving over the floor structure will pass between the side wall structures, each of the side structures having an upper edge positioned above the horizontal plane of the floor structure to define with the latter a longitudinal trough; a carriage supported on the floor structure and adjustably movable longitudinally of the trough and including a platform structure having a lower end proximate the floor structure and inclined upwardly and in the direction of movement of the bales; transversely spaced longitudinally extending guide elements mounted on the carriage for vertical movement relative thereto, and normally extending in the direction of bale movement to form a continuation of the inclined platform structure; and means for adjusting said elements vertically and relative to one another whereby the continuation of the platform structure may be tilted to one side to effect movement of a bale moving upon the platform structure over the upper edge of one of the side structures.

4. A bale conveyor comprising: a longitudinally extending horizontally disposed floor structure; a conveyor supported on the floor structure and adapted to move bales in a given direction longitudinally over the floor structure; a pair of longitudinally extending upright side structures rigid with and disposed on opposite sides of the floor structure whereby bales moving over the floor structure will pass between the side wall structures, each of the side structures having an upper edge positioned above the horizontal plane of the floor structure to define with the latter a longitudinal trough; a platform structure supported on the floor structure inclined upwardly and in the direction of movement of the bales and including transversely spaced longitudinally extending guide elements mounted for vertical movement relative thereto and normally extending in the direction of bale movement to form a continuation of the inclined platform structure; and means for adjusting said elements vertically and relative to one another whereby the continuation of the platform structure may be tilted to one side to effect movement of a bale moving up the platform structure over the upper edge of one of the side structures.

5. A bale conveyor comprising: a longitudinally extending horizontally disposed floor structure; a conveyor supported on the floor structure and adapted to move bales in a given direction longitudinally over the floor structure; a pair of longitudinally extending upright side structures rigid with and disposed on opposite sides of the floor structure whereby bales moving over the floor structure will pass between the side wall structures, each of the side structures having an upper edge positioned above the horizontal plane of the floor structure to define with the latter a longitudinal trough; a platform structure supported on the floor structure including transversely spaced longitudinally extending guides inclined upwardly from the floor structure and normally extending in the direction of bale movement; and means for adjusting said guides vertically and relative to one another whereby a bale moving along the guides will be tilted over the upper edge of one of the side structures.

6. A bale conveyor comprising: a longitudinally extending horizontally disposed floor structure; a conveyor supported on the floor structure and adapted to move bales in a given direction longitudinally over the floor structure; a carriage supported on the floor structure and adjustably movable longitudinally of the floor structure; hinge means supported on the carriage; a platform structure having a lower end proximate the floor structure and inclined upwardly and in the direction of movement of the bales; transversely spaced longitudinally extending guide elements mounted on the hinge means for vertical movement, the guide elements normally extending from the hinge means in the direction of bale movement and forming a continuation of the platform; and means for adjusting said elements vertically relative to one another whereby said continuation will be tilted to one side to effect movement of a bale moving up the platform off one side of the floor structure.

7. A bale conveyor comprising: a longitudinally extending horizontally disposed floor structure; a conveyor supported on the floor structure and adapted to move bales in a given direction longitudinally over the floor structure; a carriage supported on the floor structure and adjustably movable longitudinally of the floor structure; hinge means supported on the carriage; transversely spaced longitudinally extending guide elements mounted on the hinge means for vertical movement, the guide elements normally extending from the hinge means in the direction of bale movement and forming an inclined platform on which the bales may move; and means for adjusting said rods vertically relative to one another whereby said platform may be tilted to one side to effect movement of a bale moving up the platform off one side of the floor structure.

8. A bale conveyor comprising: a longitudinally extending horizontally disposed floor structure; a conveyor supported on the floor structure and adapted to move bales in a given direction longitudinally over the floor structure; a carriage supported on the floor structure and adjustably movable longitudinally of the floor structure; hinge means supported on the carriage; guide means mounted on the hinge means for vertical movement, the guide means normally extending from the hinge means in inclined relation to the floor structure and in the direction of bale movement; and means for adjusting said guide means whereby a bale moving on the guide means will be tilted off one side of the floor structure.

9. The invention defined in claim 8 in which the carriage is supported on the floor structure by track and track guide means which retain the carriage on the structure but permit longitudinal movement relative to the structure.

10. The invention defined in claim 8 in which the guide means are rockably mounted on the carriage and the adjustability of the guide means is controlled by remote means.

No references cited.

UNITED STATES PATENT OFFICE
CERTIFICATE OF CORRECTION

Patent No. 2,990,053                      June 27, 1961

Orville P. Lance et al.

It is hereby certified that error appears in the above numbered patent requiring correction and that the said Letters Patent should read as corrected below.

Column 5, line 5, for "transverse shaft" read -- hinge --; line 50, for "structures" read -- structure --; same column 5, line 69, for "upon" read -- up --.

Signed and sealed this 5th day of December 1961.

(SEAL)
Attest:

ERNEST W. SWIDER                      DAVID L. LADD
Attesting Officer                      Commissioner of Patents

USCOMM-DC